(12) United States Patent
Waina et al.

(10) Patent No.: US 11,878,500 B2
(45) Date of Patent: Jan. 23, 2024

(54) IMPACT AND KNIFE CUT RESISTANT PRE-IMPREGNATED WOVEN FABRIC FOR AIRCRAFT HEATED FLOOR PANELS

(71) Applicant: Goodrich Corporation, Charlotte, NC (US)

(72) Inventors: Daniel Waina, Uniontown, OH (US); Jin Hu, Hudson, OH (US); Casey Slane, Tallmadge, OH (US); Nathaniel Ching, Hartville, OH (US); Galdemir Cezar Botura, Akron, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/804,436

(22) Filed: May 27, 2022

(65) Prior Publication Data
US 2022/0288887 A1    Sep. 15, 2022

Related U.S. Application Data

(63) Continuation of application No. 16/411,561, filed on May 14, 2019, now Pat. No. 11,376,811.
(Continued)

(51) Int. Cl.
*B32B 5/02* (2006.01)
*B32B 3/12* (2006.01)
(Continued)

(52) U.S. Cl.
CPC ............... *B32B 5/024* (2013.01); *B32B 3/12* (2013.01); *B32B 15/14* (2013.01); *B32B 27/08* (2013.01); *B64C 1/18* (2013.01); *B32B 2260/021* (2013.01); *B32B 2260/046* (2013.01); *B32B 2262/101* (2013.01); *B32B 2262/106* (2013.01);
(Continued)

(58) Field of Classification Search
CPC .......... B32B 5/024; B32B 3/12; B32B 15/14; B32B 27/08; B32B 2260/021; B32B 2260/046; B32B 2262/101; B32B 2262/106; B32B 2305/024; B32B 2305/07; B32B 2307/558; B32B 2307/581;
(Continued)

(56) References Cited

U.S. PATENT DOCUMENTS

| 949,389 A | 2/1910 | Almgren |
| 3,584,198 A | 6/1971 | Doi et al. |

(Continued)

FOREIGN PATENT DOCUMENTS

| EP | 1638371 A1 | 3/2006 |
| EP | 2113456 A2 | 11/2009 |

(Continued)

OTHER PUBLICATIONS

Espacenet Translation of KR 20170140587 A (Year: 2022).*
(Continued)

*Primary Examiner* — Michael Zhang
(74) *Attorney, Agent, or Firm* — Kinney & Lange, P. A.

(57) ABSTRACT

A heated floor panel assembly for aircraft includes an impact layer made from a 2-D or 3-D woven high temperature thermoplastic fiber matrix impregnated with a resin. The impact layer can further include woven metallic fibers. The assembly also includes a stack of structural layers, a heating layer, and a core layer for absorbing shear stress.

16 Claims, 4 Drawing Sheets

Related U.S. Application Data

(60) Provisional application No. 62/693,752, filed on Jul. 3, 2018.

(51) Int. Cl.
*B32B 15/14* (2006.01)
*B32B 27/08* (2006.01)
*B64C 1/18* (2006.01)

(52) U.S. Cl.
CPC ..... *B32B 2305/024* (2013.01); *B32B 2305/07* (2013.01); *B32B 2307/558* (2013.01); *B32B 2307/581* (2013.01); *B32B 2605/18* (2013.01)

(58) Field of Classification Search
CPC ..... B32B 2605/18; B64C 1/18; B29C 70/222; B29C 70/024; D03D 25/005; D03D 15/67
See application file for complete search history.

(56) References Cited

U.S. PATENT DOCUMENTS

| | | |
|---|---|---|
| 4,990,755 A | 2/1991 | Nishimura |
| 5,175,198 A | 12/1992 | Minnick et al. |
| 5,451,747 A | 9/1995 | Sullivan et al. |
| 5,547,735 A | 8/1996 | Roebroeks et al. |
| 5,806,796 A | 9/1998 | Healey |
| 6,315,007 B1 * | 11/2001 | Mohamed ............ D03D 25/005 139/11 |
| 6,429,157 B1 | 8/2002 | Kishi et al. |
| 6,519,835 B1 | 2/2003 | Von et al. |
| 6,611,659 B2 | 8/2003 | Meisiek |
| 6,825,137 B2 | 11/2004 | Fu et al. |
| 6,834,159 B1 | 12/2004 | Schramm |
| 7,087,296 B2 | 8/2006 | Porter |
| 7,247,822 B2 | 7/2007 | Johnston |
| 7,800,028 B2 | 9/2010 | Wang |
| 8,070,994 B2 | 12/2011 | Carlson et al. |
| 8,158,245 B2 | 4/2012 | Pratte et al. |
| 8,286,919 B2 | 10/2012 | Gerken et al. |
| 8,523,113 B2 | 9/2013 | Atkinson |
| 8,752,279 B2 | 6/2014 | Brittingham et al. |
| 8,772,676 B2 | 7/2014 | Augustine et al. |
| 9,161,393 B2 | 10/2015 | Kaiserman et al. |
| 9,253,823 B2 | 2/2016 | Nordman et al. |
| 9,427,940 B2 | 8/2016 | Bremmer et al. |
| 9,493,894 B2 | 11/2016 | Butler et al. |
| 9,550,330 B2 | 1/2017 | Pratte et al. |
| 9,593,917 B2 | 3/2017 | Pilpel |
| 9,630,701 B2 | 4/2017 | Hu |
| 9,736,888 B2 | 8/2017 | Duce et al. |
| 9,782,944 B2 | 10/2017 | Martin et al. |
| 9,855,721 B2 | 1/2018 | Drexler et al. |
| 9,914,522 B2 | 3/2018 | Nehring |
| 9,939,087 B2 | 4/2018 | Kolarski et al. |
| 10,875,623 B2 | 12/2020 | Hu et al. |
| 2002/0153368 A1 | 10/2002 | Gardner et al. |
| 2003/0199947 A1 | 10/2003 | Gardner et al. |
| 2004/0078976 A1 | 4/2004 | Ahn et al. |
| 2005/0042416 A1 | 2/2005 | Blackmon et al. |
| 2005/0173414 A1 | 8/2005 | Ishii et al. |
| 2006/0138279 A1 | 6/2006 | Pisarski |
| 2008/0081528 A1 | 4/2008 | Carter et al. |
| 2008/0210820 A1 | 9/2008 | Kismarton et al. |
| 2009/0011210 A1 | 1/2009 | Gao et al. |
| 2009/0236327 A1 | 9/2009 | Everly et al. |
| 2009/0321414 A1 | 12/2009 | Doehring et al. |
| 2011/0108545 A1 | 5/2011 | Wang et al. |
| 2011/0226751 A1 | 9/2011 | Lazanja et al. |
| 2012/0234819 A1 | 9/2012 | Berger |
| 2012/0247641 A1 | 10/2012 | Ruggiero et al. |
| 2014/0044914 A1 | 2/2014 | Kurtz et al. |
| 2014/0071216 A1 | 3/2014 | Hu et al. |
| 2014/0094077 A1 * | 4/2014 | Goulet .................. B29C 63/18 442/310 |
| 2014/0326709 A1 | 11/2014 | Chabach et al. |
| 2015/0053663 A1 | 2/2015 | Sakota et al. |
| 2015/0076137 A1 | 3/2015 | Kim |
| 2015/0373782 A1 | 12/2015 | Kang et al. |
| 2016/0007474 A1 | 1/2016 | Dardona et al. |
| 2016/0089853 A1 | 3/2016 | Meure et al. |
| 2016/0121933 A1 | 5/2016 | Ohmura |
| 2016/0121993 A1 | 5/2016 | Nehring |
| 2016/0297509 A1 | 10/2016 | Estadieu et al. |
| 2016/0340020 A1 | 11/2016 | Owens et al. |
| 2016/0361889 A1 | 12/2016 | Bartolome |
| 2017/0006664 A1 | 1/2017 | Lim et al. |
| 2017/0050395 A1 | 2/2017 | Vos et al. |
| 2017/0158898 A1 | 6/2017 | Xiao et al. |
| 2017/0238369 A1 | 8/2017 | Owens et al. |
| 2017/0245326 A1 | 8/2017 | Rivat et al. |
| 2017/0254065 A1 | 9/2017 | Hegenbart et al. |
| 2018/0050523 A1 | 2/2018 | Pilpel et al. |
| 2018/0057748 A1 | 3/2018 | Hochstetter et al. |
| 2018/0124874 A1 | 5/2018 | Dardona et al. |
| 2018/0127081 A1 | 5/2018 | Toral Vázquez et al. |
| 2018/0176989 A1 | 6/2018 | Hu et al. |
| 2020/0009825 A1 | 1/2020 | Waina et al. |
| 2020/0010167 A1 | 1/2020 | Slane et al. |
| 2020/0010168 A1 | 1/2020 | Hu et al. |
| 2020/0010169 A1 | 1/2020 | Slane et al. |
| 2020/0011542 A1 | 1/2020 | Ching et al. |
| 2020/0011543 A1 | 1/2020 | Hu et al. |
| 2020/0015325 A1 | 1/2020 | Zhao et al. |
| 2021/0134496 A1 | 5/2021 | Xiao et al. |

FOREIGN PATENT DOCUMENTS

| | | |
|---|---|---|
| EP | 3015360 A1 | 5/2016 |
| EP | 3095690 A2 | 11/2016 |
| EP | 3339013 A1 | 6/2018 |
| EP | 3587097 A1 | 1/2020 |
| GB | 1444718 A | 8/1976 |
| JP | H0732518 A | 2/1995 |
| JP | 4862913 B2 | 11/2011 |
| JP | 2012501235 A | 1/2012 |
| JP | 2013511021 A | 3/2013 |
| KR | 20170140587 A * | 12/2017 |
| WO | 0117850 A1 | 3/2001 |
| WO | 2012087294 A1 | 6/2012 |
| WO | 2014024165 A2 | 2/2014 |
| WO | 2017186895 A1 | 11/2017 |

OTHER PUBLICATIONS

Extended European Search Report for EP Application No. 19182513.2, dated Nov. 28, 2019, pp. 6.
Extended European Search Report for EP Application No. 19183571.9, dated Nov. 29, 2019, pp. 7.
Extended European Search Report for EP Application No. 19183864.8, dated Oct. 31, 2019, pp. 8.
Extended European Search Report for EP Application No. 19183876.2, dated Oct. 25, 2019, pp. 5.
Extended European Search Report for EP Application No. 19183891.1, dated Nov. 4, 2019, pp. 7.
Extended European Search Report for EP Application No. 19184091.7, dated Nov. 28, 2019, pp. 6.
Jeff Sloan, Materials & Processes: Composites fibers and resins, https://www.compositesworld.com/articles/composites-101-fibers-and-resins (Year: 2016).
Polymer Database, Unfilled Polyetheretherketone (PEEK), https://polymerdatabase.com/Commercial%20Polymers/PEEK.html (Year:2021).
PolymerDatabase, Unfilled Polyetherimide, https://web.archive.org/web/20160115000000*/https://polymerdatabase.com/Commercial%20Polymers/PEI.html (Year:2016).
R.H. Gong, Chapter 14-Yarn to Fabric: Specialist Fabric Structures, Editor(s): Rose Sinclair, In Woodhead Publishing Series in Textiles, (Year: 2015).
Communication Pursuant to Article 94(3) EPC for EP Application No. 19183891.1, dated Dec. 3, 2020, pp. 5.

(56) References Cited

OTHER PUBLICATIONS

First Japanese Office Action for JP Application No. 2019-114176, dated Nov. 1, 2022, pp. 10.
First Brazilian Office Action for BR Application No. BR1020190126531, dated Mar. 1, 2023, pp. 6.

* cited by examiner

IMPACT AND KNIFE CUT RESISTANT PRE-IMPREGNATED WOVEN FABRIC FOR AIRCRAFT HEATED FLOOR PANELS

CROSS-REFERENCE TO RELATED APPLICATION(S)

This application is a continuation of U.S. application Ser. No. 16/411,561 filed May 14, 2019 for "IMPACT AND KNIFE CUT RESISTANT PRE-IMPREGNATED WOVEN FABRIC FOR AIRCRAFT HEATED FLOOR PANELS," which in turn claims the benefit of U.S. Provisional Application No. 62/693,752 filed Jul. 3, 2018 for "IMPACT AND KNIFE CUT RESISTANT PRE-IMPREGNATED WOVEN FABRIC FOR AIRCRAFT HEATED FLOOR PANELS" by D. Waina, J. Hu, C. Slane, N. Ching and G. C. Botura.

BACKGROUND

This application relates generally to heated floor panel assemblies for aircraft, and specifically to impact layers for heated floor panel assemblies.

Heated floor panels are often used in aircraft to mitigate the effects of cold underfloor temperatures and to help maintain a comfortable cabin temperature. The floor panels are typically supported by an aircraft structure arranged, for example, in a grid-like pattern. The floor panels have structural integrity sufficient to support the weight of people and objects resting on the panels. An impact layer typically forms the top surface of the panel to protect the underlying layers (e.g. weight supporting layers and/or a heating layer) from punctures from high heels, chips from dropped objects, scratches from dragged luggage, and/or other floor-traffic related hazards.

Impact Layers can be made with pre-impregnated fabrics where a fiber matrix is impregnated with a resin. Typically, the fiber matrix is made of loose fibers such as fiberglass or carbon fibers, typically impregnated with a phenolic resin or epoxy. To meet flammability, smoke, and toxicity requirements, the resin is usually modified with additives. These modifications result in lower mechanical strength of the impact layer. Thus, an impact layer with a stronger resin-impregnated fiber matrix is needed.

SUMMARY

In one embodiment, a floor panel assembly has a bottom surface and a top surface. The floor panel assembly includes a first stack of structural layers adjacent the bottom surface, a core layer adjacent the first stack of structural layers, a second stack of structural layers between the core layer and the top surface, a heating layer between the core layer and the top surface, and a woven impact layer between the heating layer and the top surface. The core layer absorbs shear stress. The impact layer includes a woven high temperature thermoplastic fiber matrix and a resin infiltrating the woven fiber matrix. The thermoplastic fiber matrix has a melting point between melting points between 150 and 400 degrees Celsius. The resin is an epoxy, phenolic, bismaleimide, or cyanate ester resin.

In a different embodiment, a method of making a heated floor panel assembly includes aligning a woven impact layer, a heater, a core layer, and one or more structural facing layers and bonding the impact layer, the heater, the core layer, and the one or more structural layers to each other. The woven impact layer includes a woven high temperature thermoplastic fiber matrix impregnated with a resin, which is an epoxy, phenolic, bismaleimide, or cyanate ester resin.

DETAILED DESCRIPTION

The present invention is directed to a composite panel, and more specifically, to a heated floor panel with a woven impact layer containing a woven high temperature thermoplastic fiber matrix, or a woven composite fiber matrix, impregnated with a resin. The panel further includes structural layers and a core layer supporting the assembly, and a heating layer containing a heating element.

Figure 1:
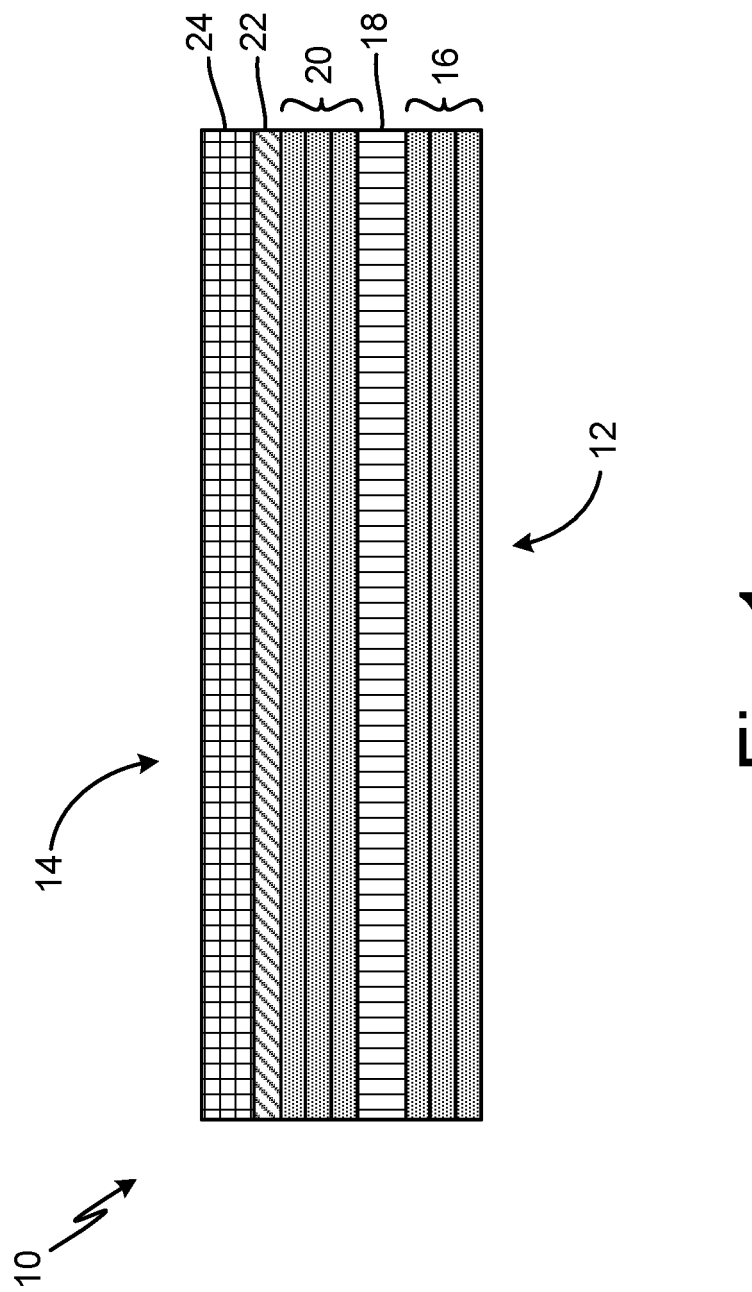
FIG. 1 is a schematic drawings of a heated floor panel assembly.

FIG. 1 is a schematic diagram of heated floor panel assembly 10 having bottom surface 12 and top surface 14. Assembly 10 contains first stack of structural layer 16, core layer 18, second stack of structural layers 20, heating layer 22, and impact layer 24.

Bottom surface 12 of assembly 10 is attached to an aircraft, while top surface 14 faces the inside of an aircraft cabin or other floor area needing to be heated. Components 16, 18, 20, 22, and 24 are arranged between bottom surface 12 and top surface 14. First stack of structural layers 16 is attached to bottom surface 12. Core layer 18 is attached to first stack of structural layers 16 opposite bottom surface 12. Second stack of structural layers 20 is attached to core layer 18 opposite first stack of structural layers 16. Heating layer 22 is attached to second stack of structural layers 20 opposite core layer 18. Impact layer 24 is attached to heating layer 22 opposite second stack of structural layers 20. Impact layer 24 faces top surface 14.

Stacks of structural layers 16 and 20 provide reinforcement to assembly 10. Stacks of structural layers 16 and 20 can be a reinforced polymer, such as a carbon fiber or fiberglass impregnated with a resin system such as epoxy, polyurethane, phenolic, cyanate ester, bismaleimide, or other appropriate resins. Each of stacks of structural layers 16 and 20 can include a single ply, or a stack of plies, depending on, for example, the material chosen to form the structural layers, or the particular need for reinforcement. Additional and/or alternative structural layers can also be added in other embodiments.

Core layer 18 provides impact resistance to assembly 10, and carries shear loads to stiffen floor panel assembly 10. Core layer 18 can, in an exemplary embodiment, be formed from a high density metallic material, such as aluminum alloy, stainless steel, or titanium, and can further be arranged in a honeycomb structure. Alternatively, core layer 18 can be formed from an expanded honeycomb polymer, such as resin-infused aramids (e.g., Kevlar® or Nomex®), resin-infused carbon fiber or fiberglass, thermoplastic tubing, as well as an open-cell or closed-cell polymer foam. Infusing resins could be epoxy, phenolic, or cyanate ester. Generally, a metallic core layer has greater thermal conductivity than a polymer core layer.

Heating layer 22 can include an electrical heating element (not shown) embedded on or in heating layer 22. The heating element can be a resistive heating element formed, for example, from a metallic material, Positive Temperature Control (PTC) ceramic, PTC polymer, or carbon allotrope material such as a carbon nanotube (CNT) heater. The heating element can be arranged as an etched foil, wire, or printed-ink element. Other suitable heating elements are contemplated herein. Heating layer 22 can be used to control the temperature of top surface 14 of assembly 10, which can be installed, for example, in an aircraft cabin or cockpit. In certain embodiments, the heating element can extend across the entire area of heating layer 22. In other embodiments, the heating element can be inset some distance from the edges of heating layer 22 in order to protect the element from fluid spills along or damage at the edges of assembly 10. The heating element is electrically connected to an electrical source via electrodes or wires.

Impact layer 24 contains both a woven fiber matrix and a resin. The woven fiber matrix of impact layer 24 can be made of a high temperature thermoplastic. The resin of impact layer 24 is a phenolic, epoxy, polyurethane, bismaleimide, or cyanate ester resin. The fiber strength should be between 55 MPa and 14 GPa.

High temperature thermoplastic (also known as high-performance thermoplastics) have working temperature up to between 150 and 400 degrees Celsius and have significant retention of physical properties, dimensional stability, and electrical characteristics at high temperatures. Thus, high temperature thermoplastics have higher heat deflection temperatures, glass transition temperatures, and continuous use temperature. Additionally, high temperature thermoplastics also offer better chemical resistance than most other polymers. High temperature thermoplastics are known to have enhanced mechanical properties, resistance to damages, and be recyclable.

As an example, PEEK contains excellent mechanical and chemical resistance during high temperature applications. PEEK has tensile modulus strength of 90-200 MPa, a melting temperature of 343 degrees Celsius, and a density of 1.32 g/cm$^3$. Similarly, PEI offers outstanding elevated thermal resistance, high strength, stiffness and chemical resistance. PEI has a tensile modulus strength between 96-190 MPa, a melting temperature above 217 degrees Celsius, and an amorphous density of 1.27 g/cm3. Similarly, PTFE fibers (such as Gore® Fibers) can have a tensile strength up to 13 GPa when properly processed, a melting temperature of 340 degrees Celsius, and a density of 2.2 g/cm$^3$.

The high temperature thermoplastic can be a polyether ether ketone (PEEK), polyaryletherketones (PAEK), polycarbonate (PC), polyphenylene sulfide (PPS), polyetherimide (PEI), polyimide, poly(methyl methacrylate) (PMMA), polyvinyl chloride, polyurethane, polytetrafluoroethylene (PTFE), or polyamideimide. Alternatively, the woven fiber matrix of impact layer 24 can be a composite matrix including both high temperature thermoplastic fibers and metallic fibers woven together. The fibers can be woven in two dimensions, or woven in three dimensions to create a woven impact layer.

The use of a high temperature thermoplastic resin allows for assembly 10 to meet more stringent flammability, smoke, and toxicity (FST) requirements due to the toughness of the high temperature thermoplastic resin. The U.S. Federal Aviation Administration (FAA) mandates stringent FST characteristics for aircraft cabin components under 14 C.F.R. 25.853. Generally reported as peak heat release (kilowatts per square meter) and total heat release (kilowatts per minute per square meter), the FAA regulatory peak/total requirement number is 65 kW/m$^2$ peak heat release and 65 kW/m$^2$ total heat release. High temperature thermoplastic resins have low smoke release in smoke tests and low flammability, surpassing these requirements.

High temperature thermoplastics also have high mechanical strength, high level of toughness, strength, stiffness, resistance to fatigue and ductility, sufficiently protecting floor panel assemblies from puncture or damage. Additionally, high temperature thermoplastics show increased resistance to chemicals, solvents, radiation and heat, and do not disintegrate or lose its form upon exposure.

Figure 2:
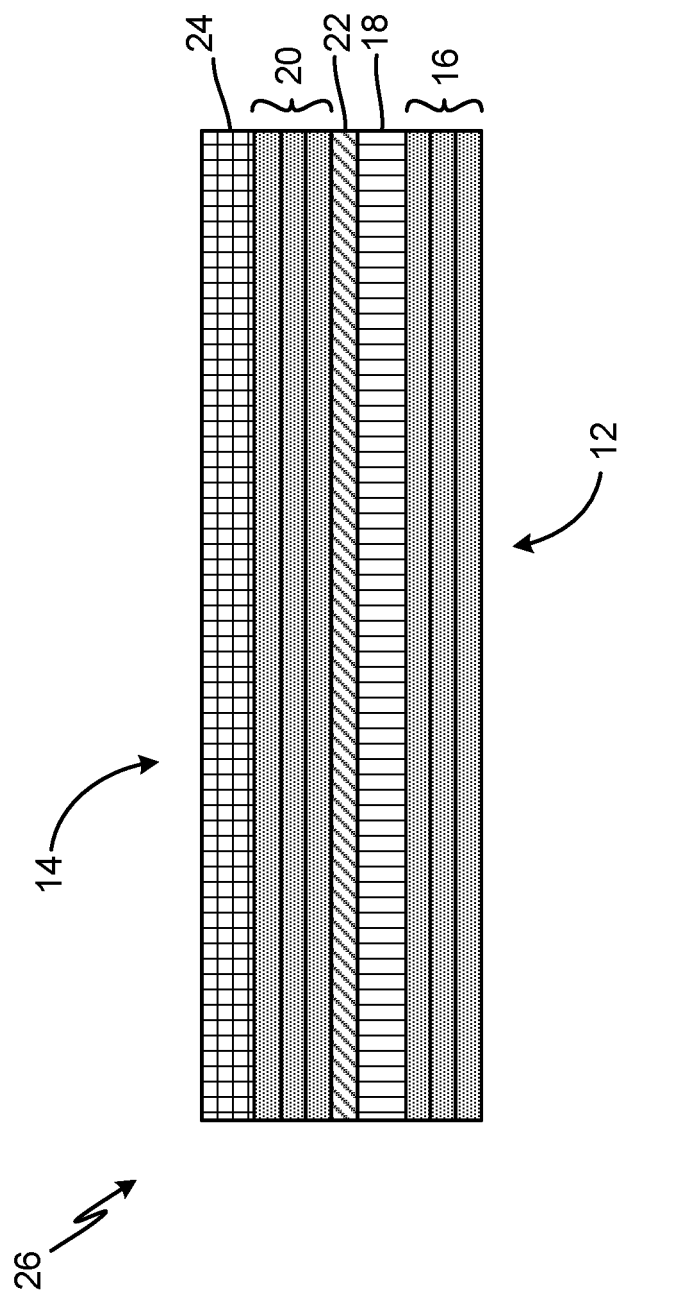
FIG. 2 is a schematic drawings of a heated floor panel assembly in a different embodiment.

FIG. 2 is a schematic drawings of heated floor panel assembly 26 in a different embodiment. Assembly 26 has many of the same components as assembly 10 in FIG. 1, but arranged in a different configuration.

Here, as in assembly 10, bottom surface 12 of assembly 10 is anchored to an aircraft, while top surface 14 faces the inside of an aircraft cabin or other floor area needing to be heated. Components 16, 18, 20, 22, and 24 are arranged between bottom surface 12 and top surface 14. First stack of structural layers 16 is attached to bottom surface 12. Core layer 18 is attached to first stack of structural layers 16 opposite bottom surface 12.

However, heating layer 22 is attached to core layer 18 opposite first stack of structural layers 16. Because of this, second stack of structural layers 20 are attached to heating layer 22 opposite core layer 18, and impact layer 24 is attached directly to second stack of structural layers 20. Impact layer 24 faces top surface 14.

Figure 3:
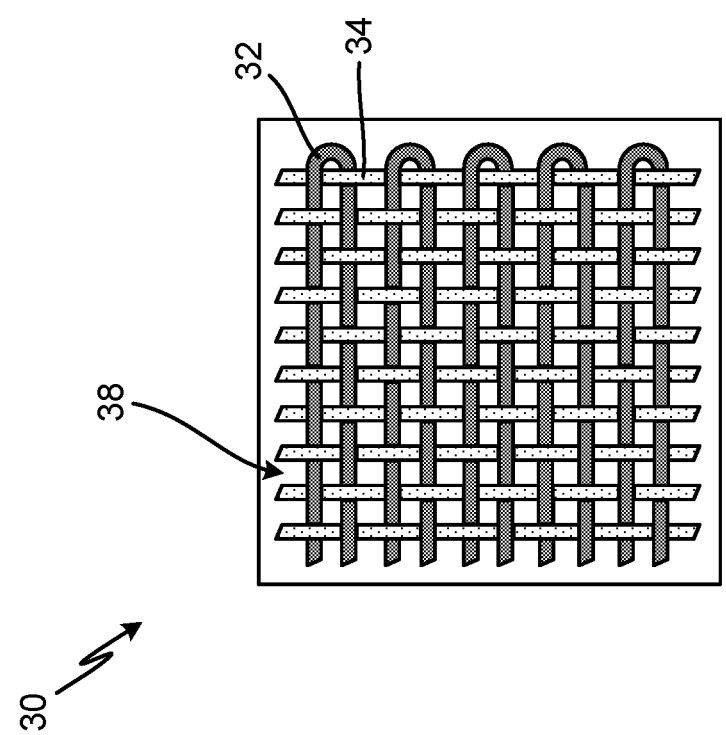
FIG. 3 is a schematic drawing of a 2-D woven impact layer with a high temperature thermoplastic fiber matrix for a floor panel assembly.

FIG. 3 is a schematic drawing of 2-D woven impact layer 30 with a high temperature thermoplastic fiber matrix for a floor panel assembly. Woven impact layer 30 includes first x-fibers 32, y-fibers 34, and resin 38. Weaving patterns may be plain woven, twill, satin, jersey knit, or interlock knit.

X-fibers 32 and y-fibers 34 are high temperature thermoplastic fibers that have been woven together according to a pattern. Fibers 32, 34, can be for example, polyetheretherketone, polyaryletherketones, polycarbonate, polyphenylene sulfide, polyetherimide, polyimide, polymethylmethacrylate (acrylic), polyvinylchloride, polyurethane, polytetrafluoroethylene, or polyamideimide. The high temperature thermoplastic material has low smoke release in smoke tests and low flammability.

The woven nature of the fiber matrix creates a mechanically sound impact layer. Resin 38 is impregnated throughout woven impact layer 30 around x-fibers 32, y-fibers 34, and securing fibers 32, 34, in the weave of impact layer 30. Resin 38 can be an epoxy or phenolic resin, added either after weaving of impact layer 30, or during weaving of impact layer 30.

Figure 4:
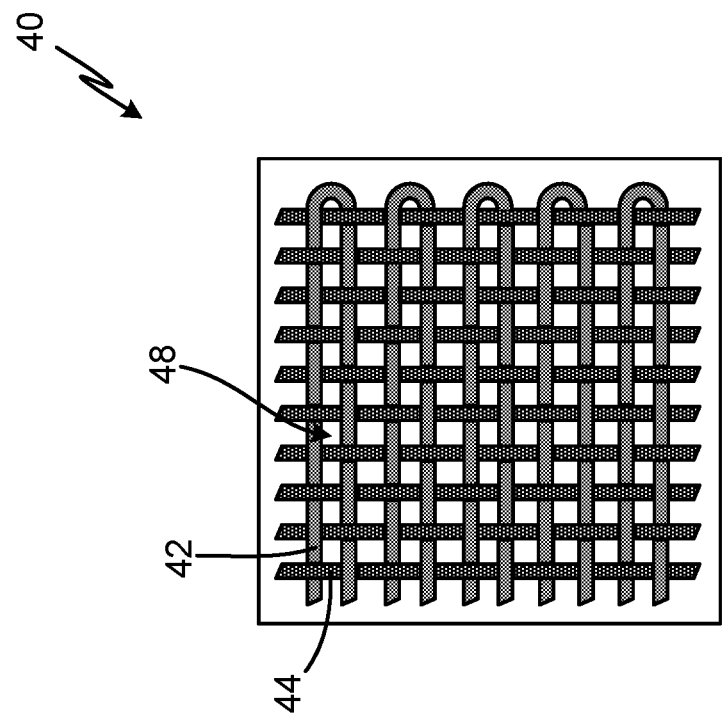
FIG. 4 is a schematic drawing of a 2-D woven impact layer with a composite fiber matrix for a floor panel assembly.

FIG. 4 is a schematic drawing of 2-D woven impact layer 40 with a composite fiber matrix for a floor panel assembly. Woven impact layer 40 includes x-fibers 42, y-fibers 44, and resin 48. X-fibers 42, y-fibers 44, and resin 48 are connected in the same manner as their corresponding components in FIG. 3.

Like in FIG. 3, x-fibers 42 are high temperature thermoplastic fibers, and resin 48 is a phenolic or epoxy resin. However, y-fibers 44 are metallic fibers. Thus, impact layer 40 is a composite layer. In alternative embodiments, x-fibers can be metallic and y-fibers can be a high temperature thermoplastic. Generally, metallic fibers should be no more than 50% of fibers in the matrix to reduce the weight of impact layer 40. Additionally, the x-fibers and the y-fibers can alternate between a high temperature thermoplastic and a metallic fiber, with the size of the fiber thread dictating the exact percentage of metallic fibers in the woven matrix.

Metallic y-fibers 44 can be made of metals such as stainless steel, titanium alloys, or nickel alloys. Typically, metallic y-fibers 44 are hard metallic material that would withstand a knife cut. The addition of metallic y-fibers 44 to impact layer 40 increases mechanical strength of impact layer 40 compared to purely high temperature thermoplastic fiber matrices.

Figure 5:
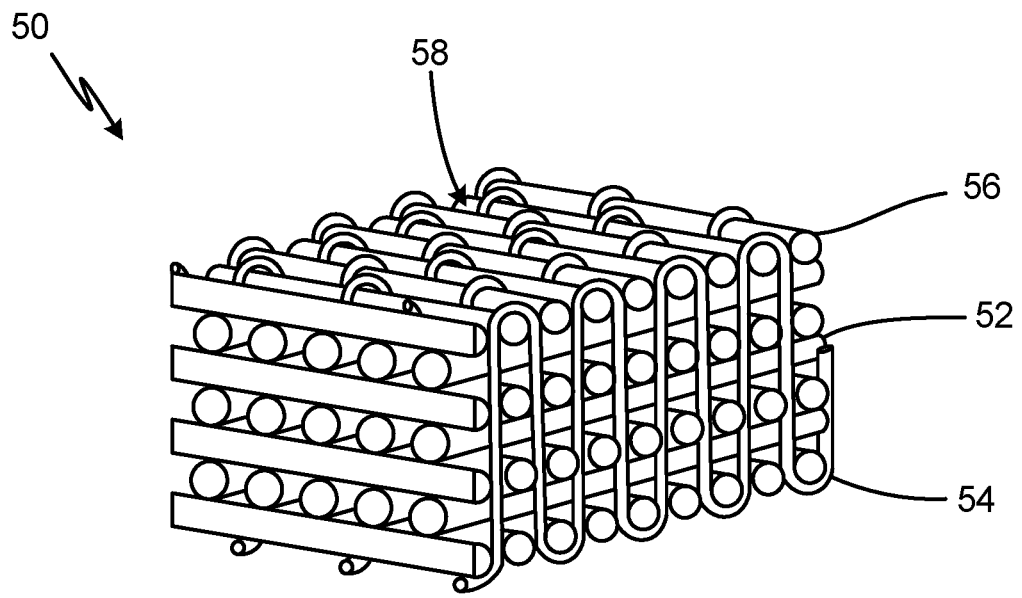
FIG. 5 is a schematic drawing of a 3-D woven impact layer with a high temperature thermoplastic fiber matrix for a floor panel assembly.

FIG. 5 is a schematic drawing of 3-D woven impact layer 50 with a high temperature thermoplastic fiber matrix for a floor panel assembly. Woven impact layer 50 includes x-fibers 52, y-fibers 54, z-fibers 56, and resin 58. Impact layer 50 may be stitched or have fibers interwoven in 2 or all three axes. For example, a 3-D woven impact layer 50 could include a plurality of impact layers (such as impact layer 40 from FIG. 4) stacked together and stitched with z-fibers 56.

Fibers 52, 54, and 56 are high temperature thermoplastic fibers that have been woven together according to a pattern. Fibers 52, 54, 56 can be for example, polyetheretherketone, polyaryletherketones, polycarbonate, polyphenylene sulfide, polyetherimide, polyimide, polymethylmethacrylate (acrylic), polyvinylchloride, polyurethane, polytetrafluoroethylene, or polyamideimide. The high temperature thermoplastic material has low smoke release in smoke tests and low flammability.

After being woven together, they are infiltrated with resin 58. The woven nature of the fiber matrix creates a mechanically sound impact layer. Resin 38 is impregnated throughout woven impact layer 50 around x-fibers 52, y-fibers 54, z-fibers 56, and securing fibers 52, 54, 56, in the weave of impact layer 50. Resin 58 can be an epoxy or phenolic resin.

Figure 6:
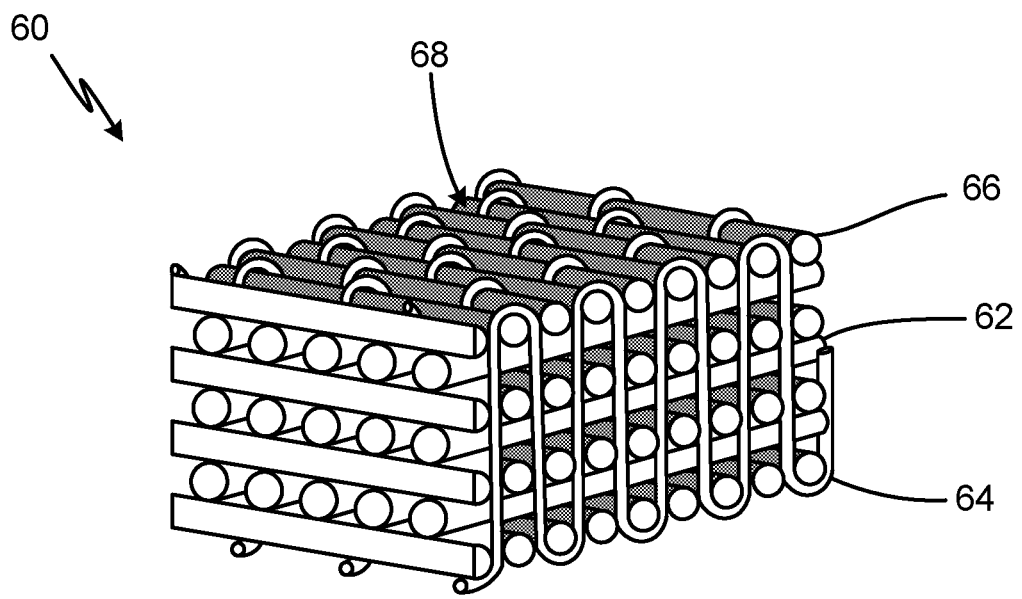
FIG. 6 is a schematic drawing of a 3-D woven impact layer with a high temperature thermoplastic fiber matrix for a floor panel assembly.

FIG. 6 is a schematic drawing of 3-D woven impact layer 60 with a high temperature thermoplastic fiber matrix for a floor panel assembly. Woven impact layer 60 includes x-fibers 62, y-fibers 64, z-fibers 66, and resin 68.

Like impact layer 50, x-fibers 62 and y-fibers 64 are high temperature thermoplastic fibers, and resin 68 is a phenolic or epoxy resin. However, z-fibers 66 are metallic fibers. Thus, impact layer 60 is a composite layer. In alternative embodiments, x-fibers and/or y-fibers can be metallic and z-fibers can be a high temperature thermoplastic.

Either a 2:1 high temperature thermoplastic fibers to metallic fibers or a 1:2 high temperature thermoplastic fibers to metallic fibers ratio can be use, depending on the needs of the floor panel assembly. Metallic fibers can be used across any of the three direction (x, y, z) as needed. Generally, metallic fibers should be no more than 66% of fibers in the matrix to reduce the weight of impact layer 60.

Metallic z-fibers 64 can be made of metals such as stainless steel, titanium alloys, or nickel alloys. Typically, metallic z-fibers 64 are hard metallic material that would withstand a knife cut. The addition of metallic z-fibers 64 to impact layer 60 increases mechanical strength of impact layer 40 compared to purely high temperature thermoplastic fiber matrices.

A woven impact layer containing a high temperature thermoplastic fiber matrix allows for increased mechanical strength of heated floor panel assemblies which meeting flame, smoke, and toxicity requirements. Finally, high temperature thermoplastic based impact layers are environmentally friendly. High temperature thermoplastics retain the ability to be remolded several times, and can be recycled or reused while still maintaining dimensional integrity and tensile strength.

Discussion of Possible Embodiments

The following are non-exclusive descriptions of possible embodiments of the present invention.

A floor panel assembly has a bottom surface and a top surface. The floor panel assembly includes a first stack of structural layers adjacent the bottom surface, a core layer adjacent the first stack of structural layers, a second stack of structural layers between the core layer and the top surface, a heating layer between the core layer and the top surface, and a woven impact layer between the heating layer and the top surface. The core layer absorbs shear stress. The impact layer includes a woven high temperature thermoplastic fiber matrix and a resin infiltrating the woven fiber matrix. The thermoplastic fiber matrix has a melting point between melting points between 150 and 400 degrees Celsius. The resin is an epoxy, phenolic, bismaleimide, or cyanate ester resin.

The assembly of the preceding paragraph can optionally include, additionally and/or alternatively, any one or more of the following features, configurations and/or additional components:

The woven high temperature thermoplastic fiber matrix comprises woven fibers of polyetheretherketone, polyaryletherketones, polycarbonate, polyphenylene sulfide, polyetherimide, polyimide, polymethylmethacrylate (acrylic), polyvinylchloride, polyurethane, polytetrafluoroethylene, or polyamideimide.

The high temperature thermoplastic resin has a tensile strength between 55 MPa and 14 GPa.

The woven impact layer is woven in two dimensions.

The woven impact layer is woven in three dimensions.

The woven impact layer further comprises metallic fibers interwoven with the woven high temperature thermoplastic fiber matrix.

The core layer comprises a high density metallic material in a honeycomb structure.

The core layer comprises an expanded honeycomb polymer, an open-cell polymer foam, or closed-cell polymer foam.

The heating layer comprises a metallic material, Positive Temperature Control (PTC) ceramic, PTC polymer, or carbon allotrope material The first and second stacks of structural facing layers comprise a reinforced polymer matrix.

The reinforced polymer matrix comprises a fiber matrix impregnated with a structural resin.

The fiber matrix is a carbon fiber or fiberglass.

The structural resin is epoxy, polyurethane, phenolic, cyanate ester, or bismaleimide.

The heating layer is adjacent the impact layer.

The heating layer is adjacent the core layer.

The floor panel assembly includes a second impact layer between the first stack of structural layers and the core layer, and a third stack of structural layers between the first woven impact layer and the second impact layer.

A method of making a heated floor panel assembly includes aligning a woven impact layer, a heater, a core layer, and one or more structural facing layers and bonding the impact layer, the heater, the core layer, and the one or more structural layers to each other. The woven impact layer includes a woven high temperature thermoplastic fiber matrix impregnated with a resin.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A floor panel assembly having a bottom surface and a top surface, the floor panel assembly comprising:
    a first stack of structural layers adjacent the bottom surface;
    a core layer, adjacent the first stack of structural layers, that absorbs shear stress;
    a second stack of structural layers between the core layer and the top surface;
    a heating layer between the core layer and the top surface;
    a first woven impact layer between the heating layer and the top surface, the first woven impact layer comprising:
        a woven thermoplastic fiber matrix, wherein the woven thermoplastic fiber matrix has a melting point between melting points between 150 and 400 degrees Celsius; and
        a resin infiltrating the woven thermoplastic fiber matrix, wherein the resin is an epoxy, phenolic, bismaleimide, or cyanate ester resin,
        wherein the first woven impact layer is woven in two dimensions having a plurality of x-fibers and a plurality of y-fibers,
        wherein the plurality of x-fibers and the plurality of y-fibers alternate between high temperature thermoplastic fibers and metallic fibers such that the first woven impact layer comprises no more than 50% metallic fibers; and
    a second impact layer between the first stack of structural layers and the core layer; and
    a third stack of structural layers between the first woven impact layer and the second impact layer.

2. The floor panel assembly of claim 1, wherein the woven thermoplastic fiber matrix comprises woven fibers of polyetheretherketone, polyaryletherketones, polycarbonate, polyphenylene sulfide, polyetherimide, polyimide, polymethylmethacrylate, polyvinylchloride, polyurethane, polytetrafluoroethylene, or polyamideimide.

3. The floor panel assembly of claim 1, wherein the woven thermoplastic fiber matrix has a tensile strength between 55 MPa and 14 GPa.

4. The floor panel assembly of claim 1, wherein the core layer comprises a metallic material in a honeycomb structure.

5. The floor panel assembly of claim 1, wherein the core layer comprises an expanded honeycomb polymer, an open-cell polymer foam, or closed-cell polymer foam.

6. The floor panel assembly of claim 1, wherein the heating layer comprises a metallic material, Positive Temperature Control (PTC) ceramic, PTC polymer, or carbon allotrope material.

7. The floor panel assembly of claim 1, wherein the first and second stacks of structural layers comprise a reinforced polymer matrix.

8. The floor panel assembly of claim 7, wherein the reinforced polymer matrix comprises a fiber matrix impregnated with a structural resin.

9. The floor panel assembly of claim 8, wherein the fiber matrix is a carbon fiber or fiberglass.

10. The floor panel assembly of claim 8, wherein the structural resin is epoxy, polyurethane, phenolic, cyanate ester, or bismaleimide.

11. The floor panel assembly of claim 1, wherein the heating layer is adjacent the woven impact layer.

12. The floor panel assembly of claim 1, wherein the heating layer is adjacent the core layer.

13. A method of making a heated floor panel assembly comprising:
    aligning a first woven impact layer, a heating layer, a core layer, and one or more structural facing layers, wherein the first woven impact layer comprises a woven high temperature thermoplastic fiber matrix impregnated with a resin, wherein the resin is an epoxy, phenolic, bismaleimide, or cyanate ester resin;
    bonding the first woven impact layer, the heating layer, the core layer, and the one or more structural facing layers to each other to form the heated floor panel assembly comprising:
        a first stack of structural layers adjacent a bottom surface of the heated floor panel assembly
        the core layer, adjacent the first stack of structural layers, that absorbs shear stress;
        a second stack of structural layers between the core layer and a top surface of the heated floor panel assembly;
        the heating layer between the core layer and the top surface;
        the first woven impact layer between the heating layer and the top surface, the first woven impact layer comprising:
            the woven thermoplastic fiber matrix, wherein the woven thermoplastic fiber matrix has a melting point between melting points between 150 and 400 degrees Celsius; and
            the resin infiltrating the woven thermoplastic fiber matrix, wherein the resin is an epoxy, phenolic, bismaleimide, or cyanate ester resin,
            wherein the first woven impact layer is woven in two dimensions having a plurality of x-fibers and a plurality of y-fibers,
            wherein the plurality of x-fibers and the plurality of y-fibers alternate between high temperature thermoplastic fibers and metallic fibers such that the first woven impact layer comprises no more than 50% metallic fibers; and
        a second impact layer between the first stack of structural layers and the core layer; and
        a third stack of structural layers between the first woven impact layer and the second impact layer.

14. A floor panel assembly having a bottom surface and a top surface, the floor panel assembly comprising:
    a first stack of structural layers adjacent the bottom surface;
    a core layer, adjacent the first stack of structural layers, that absorbs shear stress;
    a second stack of structural layers between the core layer and the top surface;
    a heating layer between the core layer and the top surface; and a first woven impact layer between the heating layer and the top surface, the first woven impact layer comprising:
- a woven thermoplastic fiber matrix, wherein the woven thermoplastic fiber matrix has a melting point between melting points between 150 and 400 degrees Celsius; and
- a resin infiltrating the woven thermoplastic fiber matrix, wherein the resin is an epoxy, phenolic, bismaleimide, or cyanate ester resin,
- wherein the first woven impact layer is woven in three dimensions having a plurality of x-fibers, a plurality of y-fibers, and a plurality of z-fibers,
- wherein one or two of the plurality of x-fibers, the plurality of y-fibers, and the plurality of z-fibers comprises high temperature thermoplastic fibers and the other one or two of the plurality of the plurality of x-fibers, the plurality of y-fibers, and the plurality of z-fibers comprises metallic fibers;

a second impact layer between the first stack of structural layers and the core layer; and a third stack of structural layers between the first woven impact layer and the second impact layer.

15. The floor panel assembly of claim 14, wherein the second impact layer is adjacent to the first woven impact layer and is stitched to the first woven impact layers with z-fibers.

16. A method of making a heated floor panel assembly comprising:

aligning a first woven impact layer, a heating layer, a core layer, and one or more structural facing layers, wherein the first woven impact layer comprises a woven high temperature thermoplastic fiber matrix impregnated with a resin, wherein the resin is an epoxy, phenolic, bismaleimide, or cyanate ester resin;

bonding the woven impact layer, the heating layer, the core layer, and the one or more structural facing layers to each other to form the heated floor panel assembly comprising:
- a first stack of structural layers adjacent a bottom surface of the heated floor panel assembly
- the core layer, adjacent the first stack of structural layers, that absorbs shear stress;
- a second stack of structural layers between the core layer and a top surface of the heated floor panel assembly;
- the heating layer between the core layer and the top surface; and
- the first woven impact layer between the heating layer and the top surface, the first woven impact layer comprising:
- the woven thermoplastic fiber matrix, wherein the woven thermoplastic fiber matrix has a melting point between melting points between 150 and 400 degrees Celsius; and
- the resin infiltrating the woven thermoplastic fiber matrix, wherein the resin is an epoxy, phenolic, bismaleimide, or cyanate ester resin,
- wherein the first woven impact layer is woven in three dimensions having a plurality of x-fibers, a plurality of y-fibers, and a plurality of z-fibers,
- wherein one or two of the plurality of x-fibers, the plurality of y-fibers, and the plurality of z-fibers comprises high temperature thermoplastic fibers and the other one or two of the plurality of the plurality of x-fibers, the plurality of y-fibers, and the plurality of z-fibers comprises metallic fibers;
- a second impact layer between the first stack of structural layers and the core layer; and
- a third stack of structural layers between the first woven impact layer and the second impact layer.

\* \* \* \* \*